United States Patent
Mennechet et al.

(10) Patent No.: US 10,969,589 B2
(45) Date of Patent: Apr. 6, 2021

(54) HEAD UP DISPLAY SYSTEM, ASSOCIATED DISPLAY SYSTEM AND COMPUTER PROGRAM PRODUCT

(71) Applicant: THALES, Courbevoie (FR)

(72) Inventors: Florent Mennechet, Mérignac (FR); Valéry Bota, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/612,691

(22) PCT Filed: Sep. 26, 2019

(86) PCT No.: PCT/EP2019/076095
§ 371 (c)(1),
(2) Date: Nov. 11, 2019

(87) PCT Pub. No.: WO2020/064956
PCT Pub. Date: Apr. 2, 2020

(65) Prior Publication Data
US 2020/0355921 A1   Nov. 12, 2020

(30) Foreign Application Priority Data
Sep. 26, 2018   (FR) ...................................... 1800997

(51) Int. Cl.
*G06F 3/041*   (2006.01)
*G02B 27/01*   (2006.01)
(Continued)

(52) U.S. Cl.
CPC ....... *G02B 27/0172* (2013.01); *G01C 23/005* (2013.01); *G02B 27/0149* (2013.01); *G06F 3/04883* (2013.01); *G02B 2027/0165* (2013.01)

(58) Field of Classification Search
CPC ........ G06F 3/011; G06F 3/013; G06F 3/0488; G06F 2203/04806; G06F 3/012;
(Continued)

(56) References Cited

U.S. PATENT DOCUMENTS

| 4,028,725 A | 6/1977 | Lewis |
| 10,598,932 B1 * | 3/2020 | Marshall ............ G02B 27/0176 |
| 2015/0203036 A1 * | 7/2015 | Kajiwara .................. B60R 1/00 345/7 |

FOREIGN PATENT DOCUMENTS

| EP | 2 793 070 A1 | 10/2014 |
| FR | 3 057 685 A1 | 4/2018 |

OTHER PUBLICATIONS

French Search Report, from the French Patent Office in counterpart French Application No. 1800997, dated Jun. 24, 2019.

* cited by examiner

*Primary Examiner* — Duc Q Dinh
(74) *Attorney, Agent, or Firm* — Arent Fox LLP

(57) ABSTRACT

The invention relates to a head-up display system embedded in an aircraft pilotable by a pilot and having a head-down display screen. The display system includes:
- a head-up display screen configured to be arranged in the cockpit in a Plurality of positions and to be observed by the pilot from an observation point along a viewing field;
- at least one position, called interposition position, of the head-up screen corresponding to a position in which a part, called interposed part, is arranged across from a part of the head-down display screen in the viewing field between the observation point and this part;

(Continued)

a display control module configured to display a conformal display area and when the head-up display screen is in the interposition position, a non-conformal display area in the interposed part.

10 Claims, 2 Drawing Sheets

(51) Int. Cl.
  *G01C 23/00* (2006.01)
  *G06F 3/0488* (2013.01)
(58) Field of Classification Search
  CPC ............. G06F 3/04815; G06F 3/04847; G06F 3/0484; G02B 27/017; G02B 2027/0125; G02B 25/001; G02B 27/01; G02B 27/10; G02B 27/0179; G09G 2354/00; G09G 2358/00; G09G 5/14
  USPC ........................................................ 345/7–9
  See application file for complete search history.

HEAD UP DISPLAY SYSTEM, ASSOCIATED DISPLAY SYSTEM AND COMPUTER PROGRAM PRODUCT

CROSS-REFERENCE TO RELATED APPLICATIONS

This application is a National Stage Entry of International Patent Application No. PCT/EP2019/076095, filed on Sep. 26, 2019, which claims priority to French Application No. 18 00997, filed on Sep. 26, 2018. The disclosures of the priority applications are incorporated in their entirety herein by reference.

FIELD OF THE INVENTION

The present invention relates to a head up display system configured to be embedded in an aircraft pilotable by at least one pilot.

The present invention also relates to an associated display method and computer program product.

In particular, the present invention relates to the viewing of elements outside the aircraft such as the traffic in the surroundings of the aircraft.

BACKGROUND

Different systems already exist in the state of the art for visualizing the state of traffic around an aircraft.

A display system, called head-down, is known that makes it possible to display information on a screen arranged in the aircraft.

Thus, for example, the traffic alert and collision avoidance system (TCAS) proposes a two-dimensional graphic representation of the surrounding aircraft based on their horizontal distance from the given aircraft.

A display system is also known, called head-up display, that makes it possible to project the three-dimensional position of each aircraft on a transparent surface placed in front of the pilot.

Each surrounding aircraft is shown on such a surface in the form of a graphic representation that is then placed on the pilot's vision axis toward this surrounding aircraft.

This type of display is known in the state of the art as "conformal" because it is placed on the actual position aircraft and thus makes it possible to display information from the actual landscape. To do so, it depends directly on the position of the aircraft, the altitude of the aircraft and the orientation of the pilot's vision axis.

Contrary to the term "conformal", the display type of the aforementioned TCAS system is known in the state of the art as "non-conformal". In particular, this type of display depends on the speed vector of the aircraft and does not change with the changes in altitude thereof.

It is also known to use both of these display systems at the same time in order to improve the pilot's perception of the environment of the aircraft.

However, this simultaneous use of both systems is not convenient enough for the pilot.

Indeed, during the use of the head-up display system, the pilot's gaze is focused on the outside. Conversely, when the pilot uses the head-down display system, he must accommodate his vision to read the information on the screen. This transition increases the pilot's fatigue and causes him to lose time in critical situations.

SUMMARY

The present invention aims to improve the head-up display system in order to allow easier and less tiring viewing of the environment of the aircraft by the pilot.

To that end, the invention relates to a head-up display system configured to be embedded in an aircraft pilotable by at least one pilot and having a head-down display screen, the system having a head-up display screen that is at least partially transparent and configured to be arranged in the cockpit of the aircraft in a plurality of positions and to be observed by the pilot from an observation point along a viewing field of the pilot; at least one position, called interposition position, of the head-up display screen in the cockpit corresponding to a position in which a part, called interposed part, is arranged across from at least one part of the head-down display screen in the pilot's viewing field between the observation point and this part of the head-down display screen; a display control module on the head-up display screen configured to display a conformal display area and when the head-up display screen is in the interposition position, a non-conformal display area in the interposed part.

According to other advantageous aspects of the invention, the head-up display system comprises one or more of the following features, considered alone or according to all technically possible combinations:

- the display control module is configured to display a collimated image;
- the head-up display screen is a visor integrated into a helmet able to be worn by the pilot;
- the conformal display area and the non-conformal display area are distinct and in contact;
- the display control module is configured to display at least one link between the conformal display area and the non-conformal display area;
- the display control module is configured to associate a first symbol and a second symbol with at least one element outside the aircraft and to display the first symbol in the conformal display area, the second symbol in the non-conformal display area and the link connecting the first symbol and the second symbol; and
- the display system further comprises an acquisition module configured to acquire information relative to the movements of at least one finger of the pilot in contact with a touch-sensitive interface, the information being intended to control the display control module.

The invention also relates to a head-up display method in an aircraft able to be piloted by at least one pilot and having a head-down display screen, the display method comprising the following steps: —observation by the pilot of a head-up display screen that is at least partially transparent and arranged in the cockpit of the aircraft from an observation point along a viewing field of the pilot;

display on the head-up display screen of a conformal display area;

display of a non-conformal display area when the head-up display screen is in a position, called interposition position, of the head-up display screen in the cockpit corresponding to a position in which a part, called interposed part, is arranged across from at least part of the head-down display screen in the viewing field of the pilot between the observation point and this part of the head-down display screen, the non-conformal display area being displayed in the interposed part.

According to another advantageous aspect of the invention, the head-up display method comprises the following steps before the step for displaying the non-conformal display area:

displaying non-conformal information on the head-down display screen;

turning off the head-down display screen.

The invention also relates to a non-transitory computer-readable medium including a computer program product including software instructions which, when implemented by computer equipment, carry out a method as defined above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
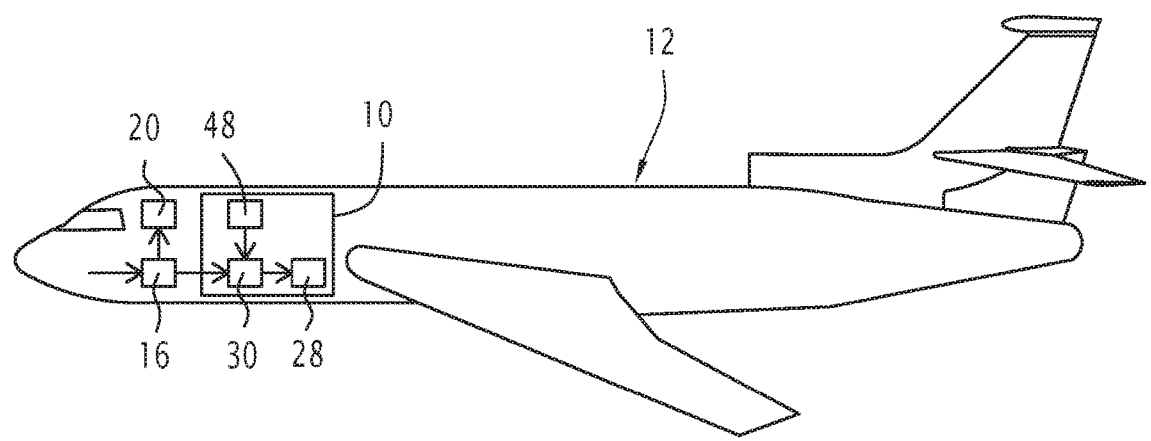
FIG. 1 is a schematic view of a head-up display system according to the invention arranged in an aircraft.

A display system 10 is shown in FIG. 1. This system 10 is embedded in an aircraft 12.

An aircraft 12 here refers to any airplane or helicopter or any other flying vehicle able to be piloted by a pilot 14 from this vehicle.

According to another example embodiment, the aircraft 12 is a drone able to be piloted remotely. In this case, the display system 10 is arranged in a control center, for example on land, from which the drone is piloted.

The aircraft 12 is surrounded by an outside environment comprising at least one outside element 15. The outside element 15 is for example a surrounding aircraft, a landing strip, an obstacle, an objective, etc.

Aside from the display system 10, the aircraft 12 comprises an acquisition module 16 making it possible to acquire the relative or absolute position of at least one outside element, such as the outside element 15.

In particular, the acquisition module 16 is configured to acquire the position of at least one outside element located at a distance smaller than a predetermined maximum distance of the aircraft 12 that is for example equal to 20 NM.

This position of such an outside element is supplied by embedded systems known in themselves, for example the traffic alert and collision avoidance system (TCAS), the surveillance system of the ADS-B (Automatic Dependent Surveillance-Broadcast) type or the radar.

Figure 2:
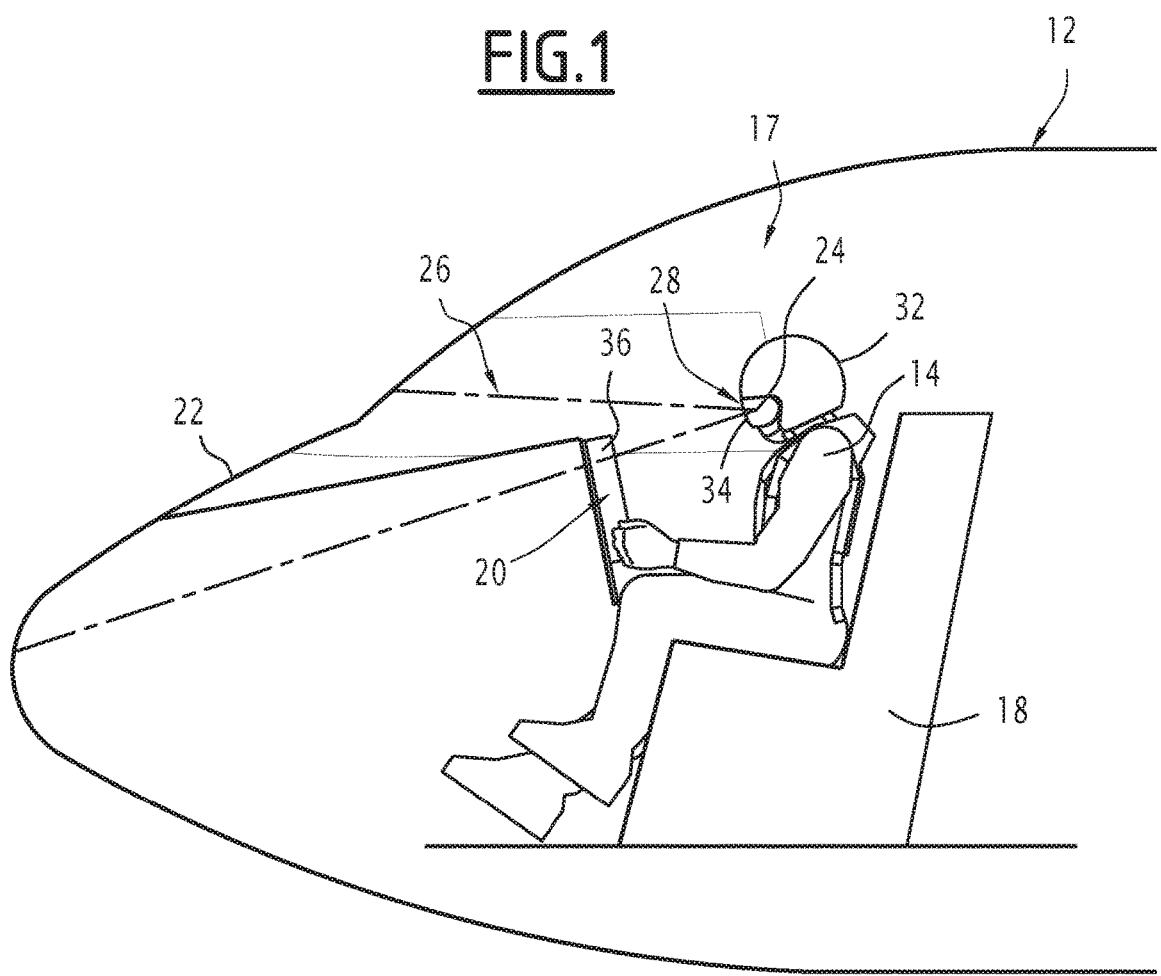
FIG. 2 is a schematic side view of a cockpit of the aircraft of FIG. 1.
Figure 3:
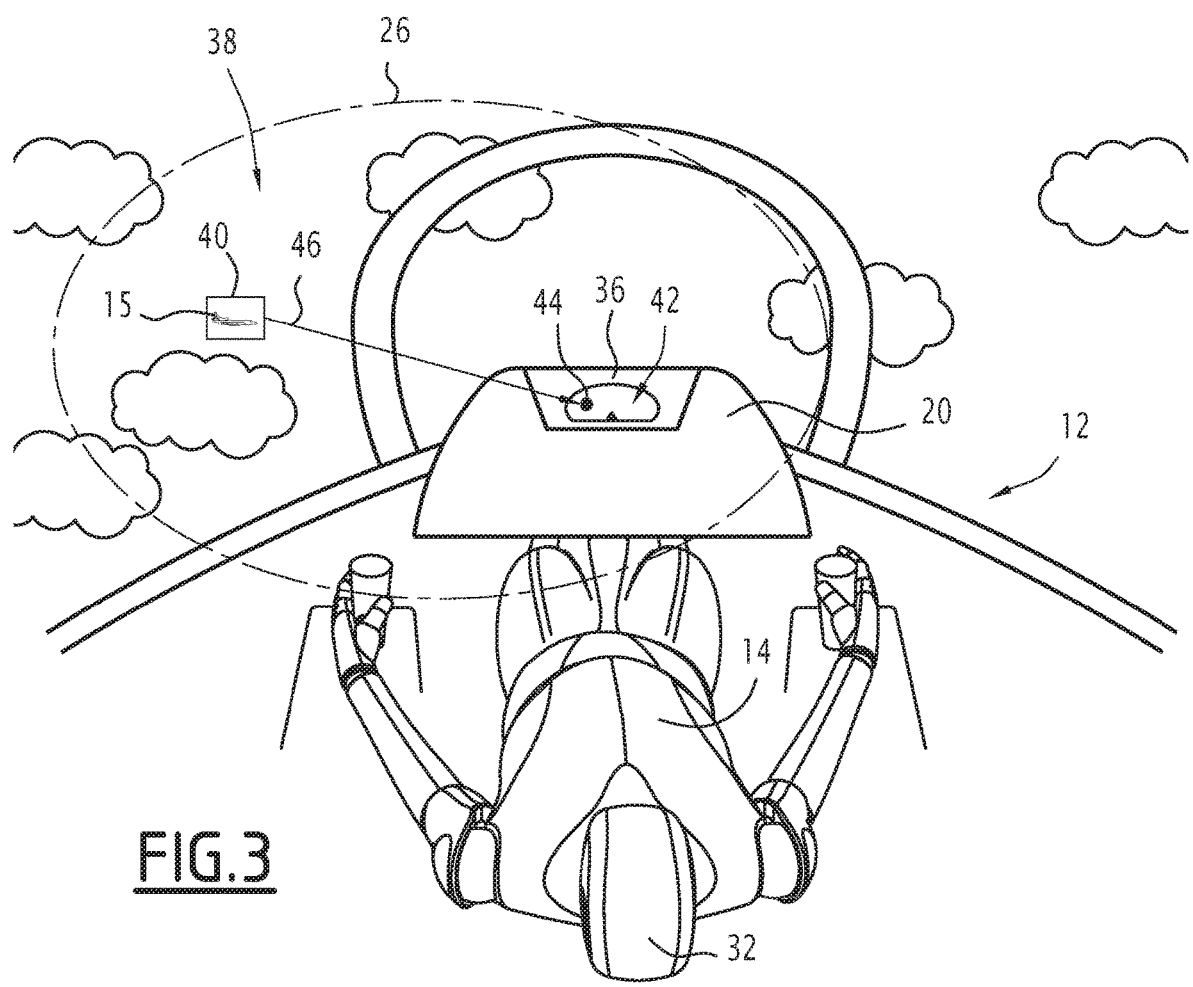
FIG. 3 is a schematic view of the inside of the cockpit of FIG. 2.

As shown in FIGS. 2 and 3, the aircraft 12 comprises a cockpit 17.

The cockpit 17 has at least one seat 18 for the pilot 14, at least one head-down display screen 20 arranged in the cockpit 17 and a windshield 22 that is at least partially transparent and separates the inside of the cockpit 17 from the outside environment of the aircraft 12.

The head-down display screen 20 is a surface configured to display at least one image.

Advantageously, the head-down display screen 20 is configured to display information relative to the outside environment of the aircraft 12 such as the traffic in the vicinity of the aircraft 12. The displayed information is then of the non-conformal type.

The head-down display screen 20 is configured to be turned on and off by the pilot 14.

The head-down display screen 20 is configured to be observed by the pilot 14 from an observation point 24 along the viewing field 26 of the pilot 14, when the pilot 14 is seated on the seat 18.

The observation point 24 is in particular one of the two eyes of the pilot 14.

The viewing field 26 of the pilot is the portion of the space able to be observed by the pilot 14 at a given moment. The viewing field 26 thus defines a solid cone having, as apex, the observation point 24.

In reference to FIG. 1, the display system 10 comprises a head-up display screen 28 and a display control module 30 on the head-up display screen 28.

The head-up display screen 28 is configured to be arranged in the cockpit 17 of the aircraft 12 in a plurality of positions.

The head-up display screen 28 is able to be observed by the pilot 14 from the observation point 24 along the viewing field 26 of the pilot 14.

The head-up display screen 28 is at least partially transparent.

Advantageously, the head-up display screen 28 is a visor integrated into a helmet 32 able to be worn by the pilot 14, as shown in FIG. 2.

In a variant, the head-up display screen 28 is a transparent surface fastened in the cockpit 17 and placed in front of the pilot 14.

As shown in FIG. 1, at least one position, called interposition position, of the head-up display screen 28 in the cockpit 17 corresponds to a position in which a part, called interposed part 34, is arranged across from at least part of the head-down display screen 20, called display part 36, in the viewing field 26 of the pilot 14 between the observation point 24 and the display part 36.

In practice, a plurality of interposition positions of the head-up display screen 28 are possible in the cockpit 17.

The display control module 30 is configured to display a conformal display area 38.

Advantageously, the conformal display area 38 is arranged across from at least part of the windshield 22 of the aircraft 12, in the viewing field 26 of the pilot between the observation point 24 and this part of the windshield 22.

In a manner known in itself, the conformal display area 38 makes it possible to view the position of at least one outside element supplied by the acquisition module 16 by projecting this position on the head-up display screen 28, superimposed on the actual landscape.

The display control module 30 is then configured to associate a first symbol 40 with each outside element to be displayed in the conformal display area 38. The first symbol 40 for example has a two-dimensional shape such as a triangle, a square, a diamond, etc. Different shapes can for example be associated with outside elements, for example depending on the nature of these elements.

When the head-up display screen 28 is in the interposition position, the display control module 30 is further configured to display a non-conformal display area 42 in the interposed part 34.

The non-conformal display area 42 makes it possible to visualize the position of at least one outside element in particular as a function of the direction of the horizontal component of the speed vector of the aircraft 12. This type of display is for example independent of the attitude of the aircraft 12, and in particular its pitch, roll and heading orientation.

In particular, the display control module 30 is configured to associate a second symbol 44 with at least one outside element to be displayed in the conformal display area 42. The second symbol 44 for example has a two-dimensional shape such as a triangle, a square, a diamond, etc. Different shapes can for example be associated with different outside elements.

In a variant, the non-conformal display area 42 makes it possible to view the planned route of the aircraft 12 on a two-dimensional map, an image of the outside coming from a camera, not shown, arranged in the aircraft 12 or information relative to at least one outside element.

The non-conformal area 42 being displayed on the interposed part 34 across from the display part 36 of the head-down display screen 20, the non-conformal area 42 does not clutter the view of the environment of the aircraft 12 through the windshield 22 for the pilot 14. Thus, the pilot 14 has a better perception of the environment of the aircraft 12.

Advantageously, as shown in FIG. 3, the display part 36, across from the interposed part 34, is arranged on the top of the head-down display screen 20. The term "top" is defined relative to the vertical axis when the aircraft 12 is resting on the ground.

In a position different from the interposition position, in particular when the display part 36 is located outside the viewing field 26 of the pilot 14, the display control module 30 is configured to display the non-conformal display area 42 across from at least part of the windshield 22 of the aircraft 12, in the viewing field 26 of the pilot between the observation point 24 and this part of the windshield 22.

Advantageously, the conformal display area 38 and the non-conformal display area 42 are distinct and in contact. Thus, the pilot 14 easily observes both areas 38, 42.

The display control module 30 is further configured to display at least one link 46 between the conformal display area 38 and the non-conformal display area 42.

In particular, for at least one outside element, the link 46 connects the first symbol 40 and the second symbol 44.

The link 46 is thus associated with a relative or absolute position of such an outside element.

Advantageously, the display control module 30 is further configured to display a collimated image.

The collimated image is an image whereof the rays of light arrive at the observation point 24 of the pilot 14 in a parallel manner.

The collimated image is then said to be returned to infinity.

Thus, when the pilot 14 has his gaze focused toward the outside of the aircraft 12, he can observe the collimated image without having to accommodate his vision to a distance closer to him. Thus, the pilot 14 does not become fatigued by accommodating his view and saves time without losing information on the environment of the aircraft 12. The pilot 14 thus more easily apprehends the critical situations that he may encounter.

Furthermore, the collimated image appears to be infinite for the pilot 14. Thus, when the pilot 14 moves his head and moves the observation point 24, the collimated image remains fixed for the pilot 14.

Advantageously, the display control module 30 is further configured to turn off the head-down display screen 20 when the display control module 30 displays a non-conformal display area 42 in the interposed part 34.

In one advantageous embodiment, the display system 10 further comprises an acquisition module 48 configured to acquire information relative to the movements of at least one finger of the pilot 14 in contact with a touch-sensitive interface. This information is intended to control the display control module 30.

Advantageously, the touch-sensitive interface is the head-down display screen 20.

The touch-sensitive interface 48 for example makes it possible to trace a route on a map displayed on the non-conformal display area 42 or to manipulate the camera of the aircraft 12.

Figure 4:
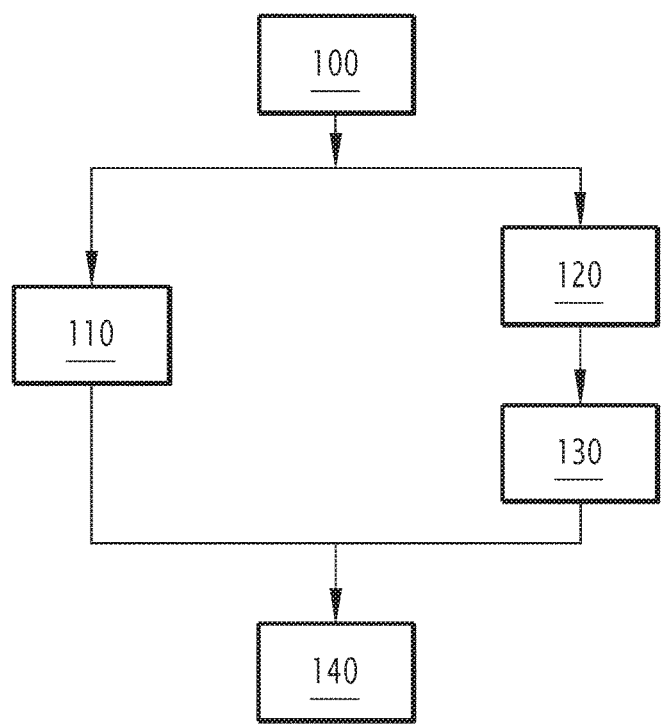
FIG. 4 is a flowchart of a head-up display method according to the invention, the method being implemented by the head-up display system of FIG. 1.

A head-up display method according to the invention will now be described in reference to FIG. 4, showing a flowchart of its steps.

The steps of this method will be explained in reference to a single outside element 15. These steps will be reiterated similarly for each additional outside element 15.

Initially, the head-down display screen 20 is turned on. The head-up display screen 28 is in the interposition position.

During the initial step 100, the acquisition module 16 acquires the position of the outside element 15, then sends it to the display control module 30 and to the head-down display screen 20.

Then, during step 110, the display control module 30 displays the conformal display area 38, advantageously in a collimated manner.

In particular, the display control module 30 displays the first symbol 40 associated with the outside element 15 in the conformal display area 38.

At the same time, the head-down display screen 20 displays at least one piece of non-conformal information relative to the position of the outside element 15. For example, the position of the outside element 15 is shown on a two-dimensional map.

The pilot 14 then separately observes the conformal display area 38 placed at infinity across from the windshield 22 and the head-down display screen 20 whose displayed image is located in the cockpit 17. The pilot 14 is thus obligated to accommodate each time he alternately observes the conformal display area 38 and the head-down display screen 20.

Then, during step 120, the pilot 14 turns off the head-down display screen 20, in particular when a critical situation appears for the pilot 14.

In a variant, the pilot 14 sends a signal to the display control module 30 when a critical situation appears for the pilot 14. The display control module 30 then turns off the head-down display screen 20.

During step 130, the display control module 30 displays the non-conformal display area 42 in a collimated manner on the interposed part 34.

In particular, the display control module 30 displays the second symbol 44 associated with the outside element 15 in the non-conformal display area 42.

The two display areas 38, 42 being displayed in a collimated manner, the two display areas 38, 42 appear infinite for the pilot 14. The pilot 14 therefore does not accommodate when he alternately looks at one of the display areas 38, 42, then the other. The pilot 14 then does not become fatigued and does not lose time needlessly during any critical situation.

Optionally, during step 140, taking place after steps 110 and 140, the display control module 30 displays at least one link 46 between the conformal display area 38 and the non-conformal display area 42. In particular, the link 46 connects the first symbol 40 and the second symbol 44.

One can then see that the present invention has a certain number of advantages.

First, the head-up display system 10 according to the invention makes it possible to display, on a same display screen 28, the conformal display area 38 and the non-conformal display area 42.

Thus, the head-up display system 10 allows a collimated display of the two areas 38, 42 and thus allows the pilot 14 to observe the two display areas 38, 42 successively without accommodating.

The invention therefore makes it possible to reduce the fatigue of the pilot 14 and avoids time losses due to accommodation.

The pilot 14 thus, owing to the invention, has a better perception of the environment of the aircraft 12 allowing him to better react in critical situations. In particular, the pilot 14 has a better perception of outside elements 15, in particular of their position.

The display of both display areas 38, 42 on the same display screen 28 further makes it possible to display the at least one link 46 between the two areas 38, 42. The link 46 then allows the pilot 14 to associate the element 15 quickly with the associated second symbol 44 displayed on the non-conformal area 42.

This link 46 then allows the pilot 14 to benefit simultaneously from the advantages of both display areas 38, 42, which reduces the workload of the pilot 14. This thus allows him to be more focused on the environment of the aircraft 12 and on the important tasks to be performed.

One can see that the invention makes it possible to resolve the drawbacks of the state of the art and to improve the head-up display system in order to allow easier and less tiring viewing of the environment of the aircraft 12 by the pilot 14.

The invention claimed is:

1. A head up display system configured to be embedded in an aircraft pilotable by at least one pilot and having a head-down display screen, the display system including:
    a head-up display screen that is at least partially transparent and configured to be arranged in the cockpit of the aircraft in a plurality of positions and to be observed by the pilot from an observation point along a viewing field of the pilot;
    at least one interposition position of the head-up display screen in the cockpit corresponding to a position in which an interposed part is arranged across from at least one part of the head-down display screen in the viewing field of the pilot between the observation point and the at least one part of the head-down display screen; and
    a display control module on the head-up display screen configured to display a conformal display area and when the head-up display screen is in the interposition position, a non-conformal display area in the interposed part,
    wherein the display control module is configured to associate a first symbol and a second symbol with at least one element outside the aircraft and to display the first symbol in the conformal display area, the second symbol in the non-conformal display area and a link connecting the first symbol and the second symbol.

2. The display system according to claim 1, wherein the display control module is configured to display a collimated image.

3. The display system according to claim 1, wherein the head-up display screen is a visor integrated into a helmet able to be worn by the pilot.

4. The display system according to claim 1, wherein the conformal display area and the non-conformal display area are distinct and in contact.

5. The display system according to claim 1, wherein the display control module is configured to display the link connecting the first symbol and the second symbol between the conformal display area and the non-conformal display area.

6. The display system according to claim 1, further comprising an acquisition module configured to acquire information relative to the movements of at least one finger of the pilot in contact with a touch-sensitive interface, the information being intended to control the display control module.

7. A head-up display method in an aircraft able to be piloted by at least one pilot and having a head-down display screen and a head-up display screen that is at least partially transparent and arranged in the cockpit of the aircraft from an observation point along a viewing field of the pilot, the display method comprising the following steps:
    displaying on the head-up display screen of a conformal display area;
    displaying a non-conformal display area when the head-up display screen is in an interposition position of the head-up display screen in the cockpit corresponding to a position in which an interposed part is arranged across from at least one part of the head-down display screen in the viewing field of the pilot between the observation point and the at least one part of the head-down display screen, the non-conformal display area being displayed in the interposed part;
    associating a first symbol and a second symbol with at least one element outside the aircraft; and
    displaying the first symbol in the conformal display area, the second symbol in the non-conformal display area and a link connecting the first symbol and the second symbol.

8. The head-up display method according to claim 7, including the following steps before the step for displaying the non-conformal display area:
    displaying non-conformal information on the head-down display screen; and
    turning off the head-down display screen.

9. A non-transitory computer-readable medium including a computer program product comprising software instructions which, when they are implemented by a piece of computer equipment including a head-down display screen and a head-up display screen that is at least partially transparent and arranged in the cockpit of the aircraft from an observation point along a viewing field of a pilot, cause the piece of computer equipment to:
    display on the head-up display screen of a conformal display area;
    display a non-conformal display area when the head-up display screen is in an interposition position of the head-up display screen in the cockpit corresponding to a position in which an interposed part, is arranged across from at least one part of the head-down display screen in the viewing field of the pilot between the observation point and the at least one part of the head-down display screen, the non-conformal display area being displayed in the interposed part;
    associate a first symbol and a second symbol with at least one element outside the aircraft; and display the first symbol in the conformal display area, the second symbol in the non-conformal display area and a link connecting the first symbol and the second symbol.

10. The non-transitory computer-readable medium according to claim 9, further comprising software instructions which cause the piece of computer equipment to:
   display non-conformal information on the head-down display screen; and
   turn off the head-down display screen.

* * * * *